United States Patent Office 3,355,003
Patented Nov. 28, 1967

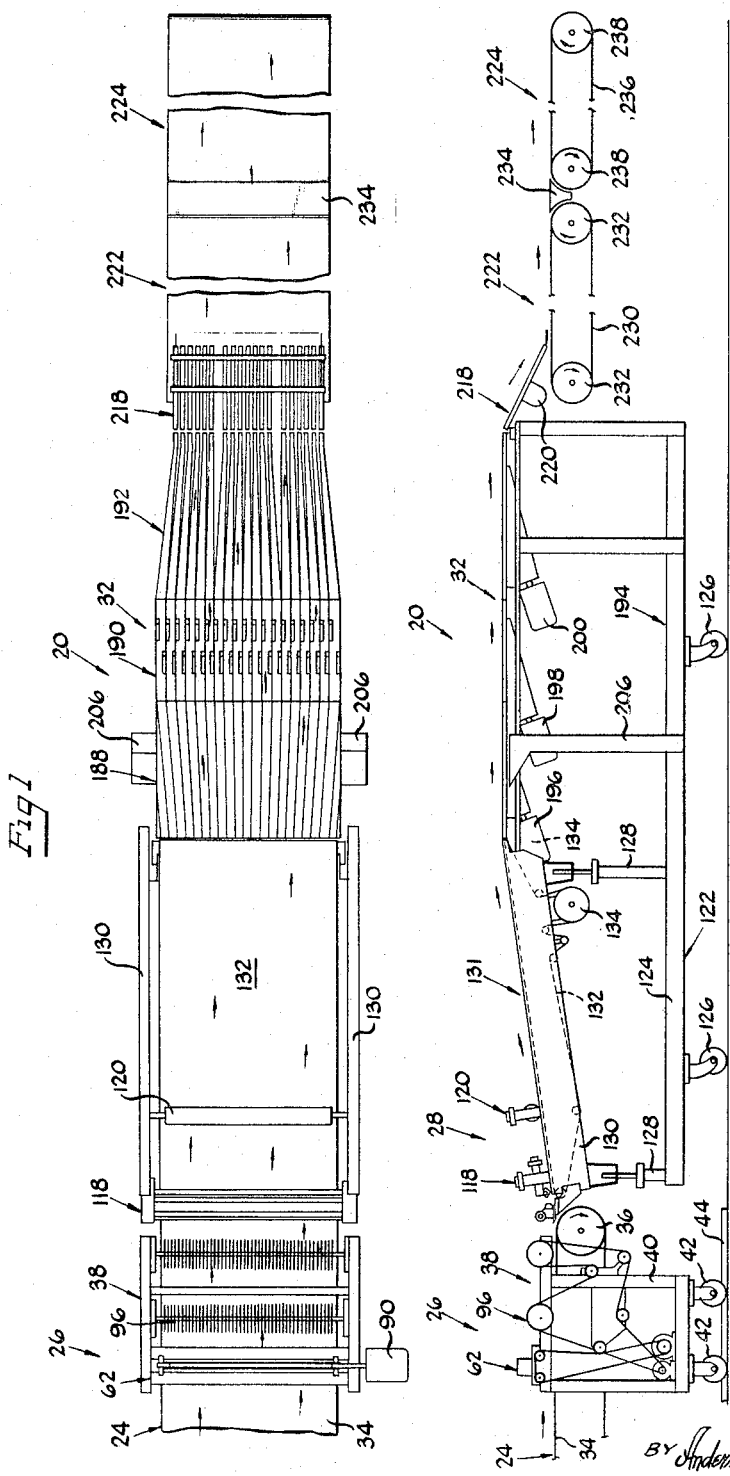

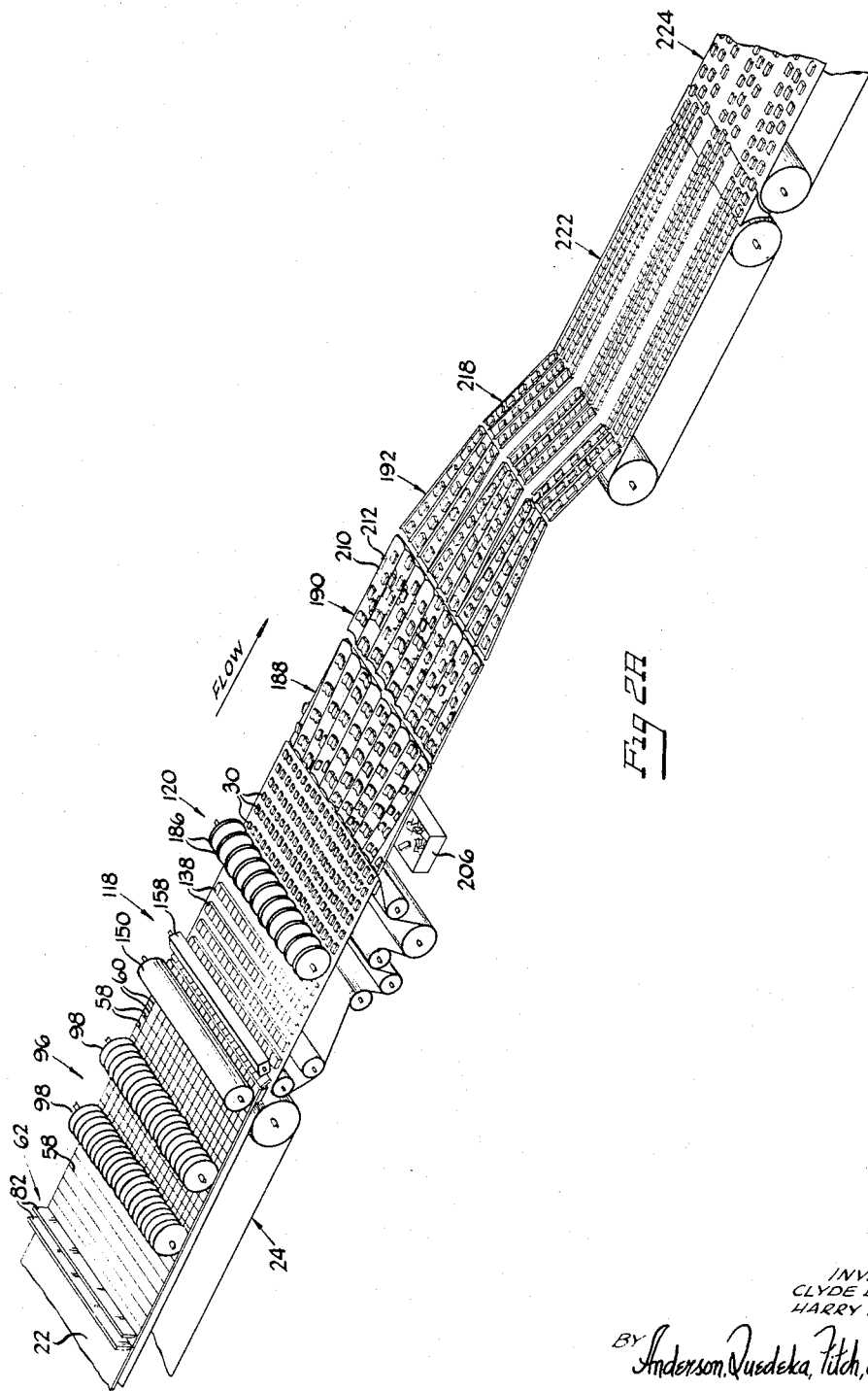

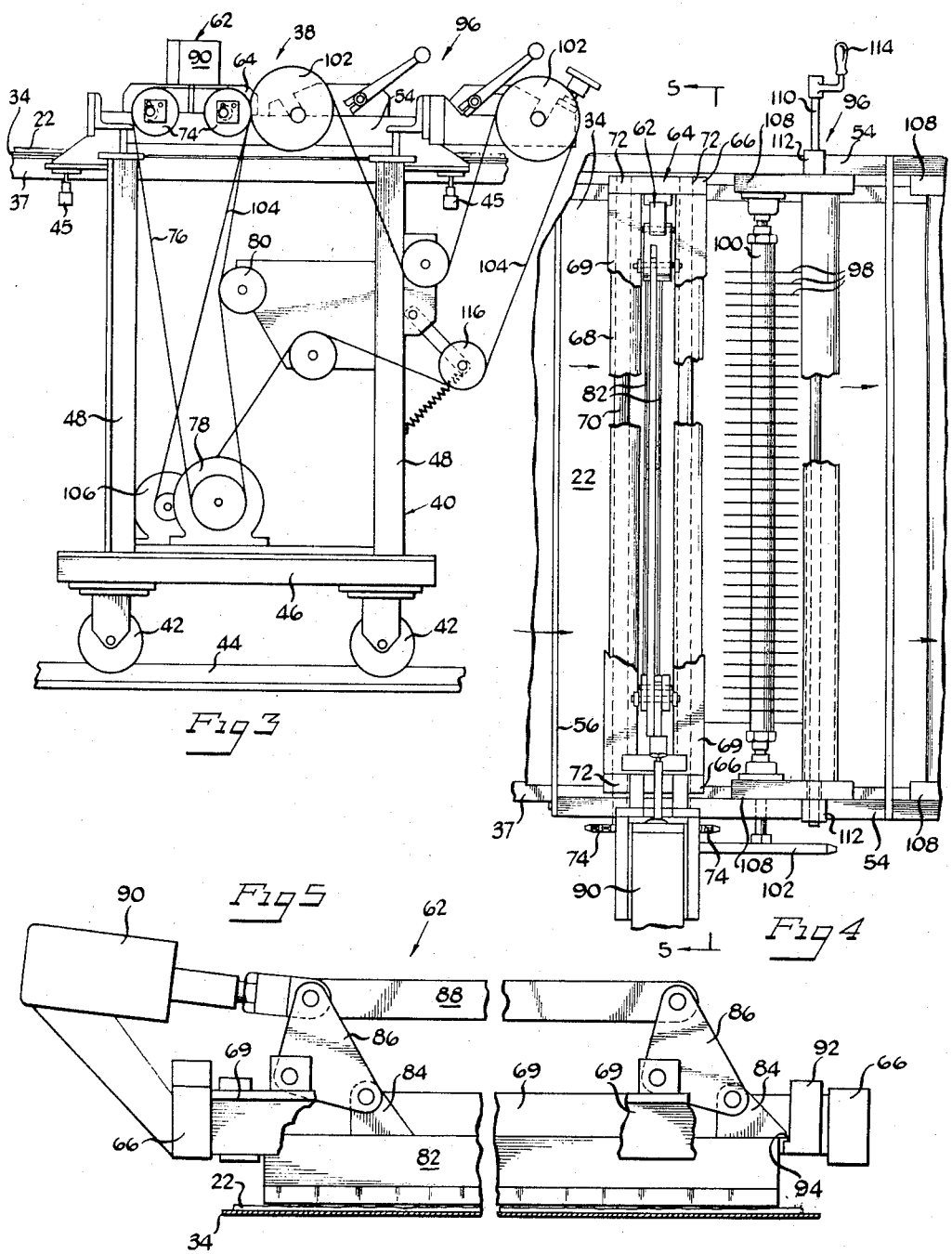

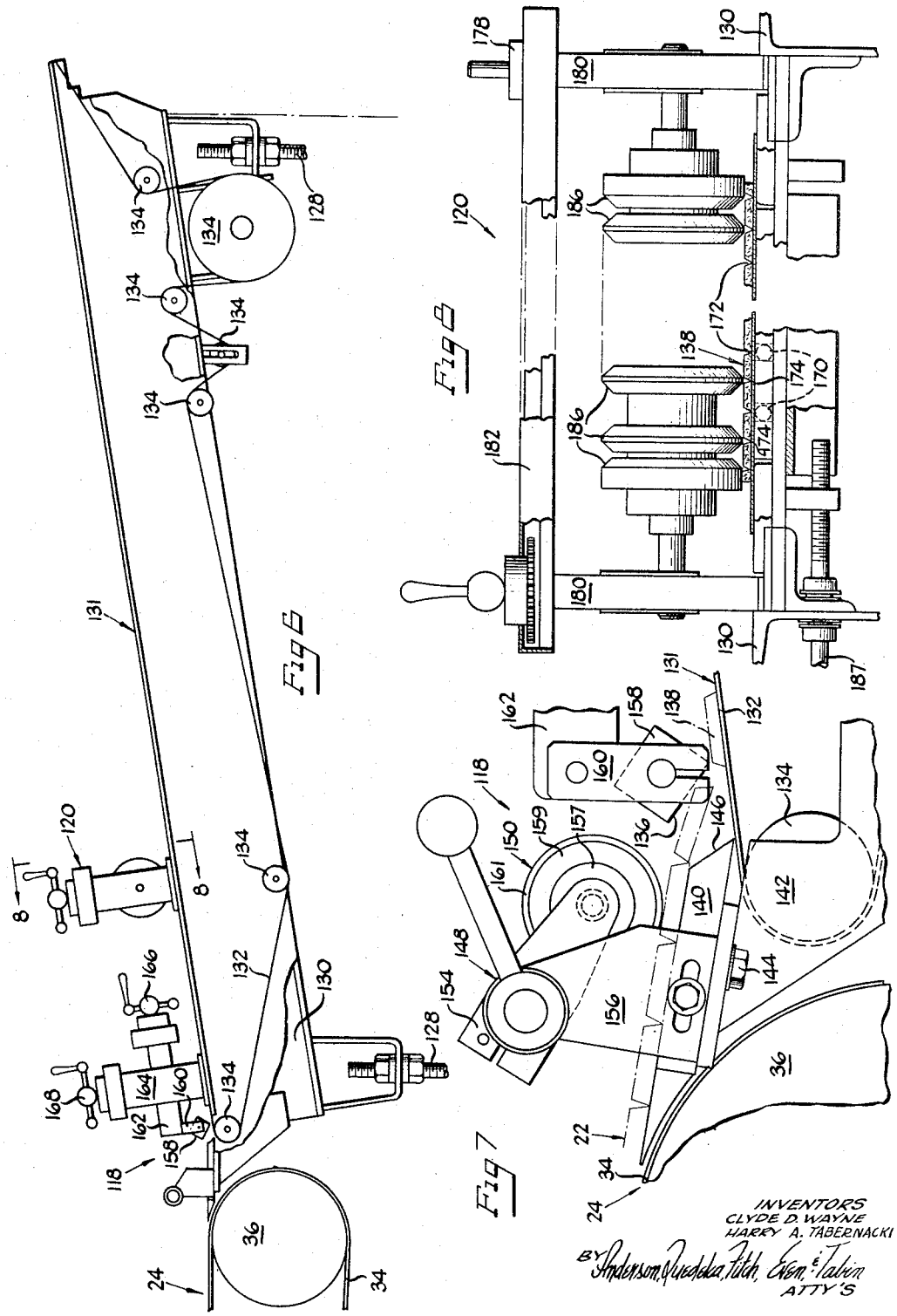

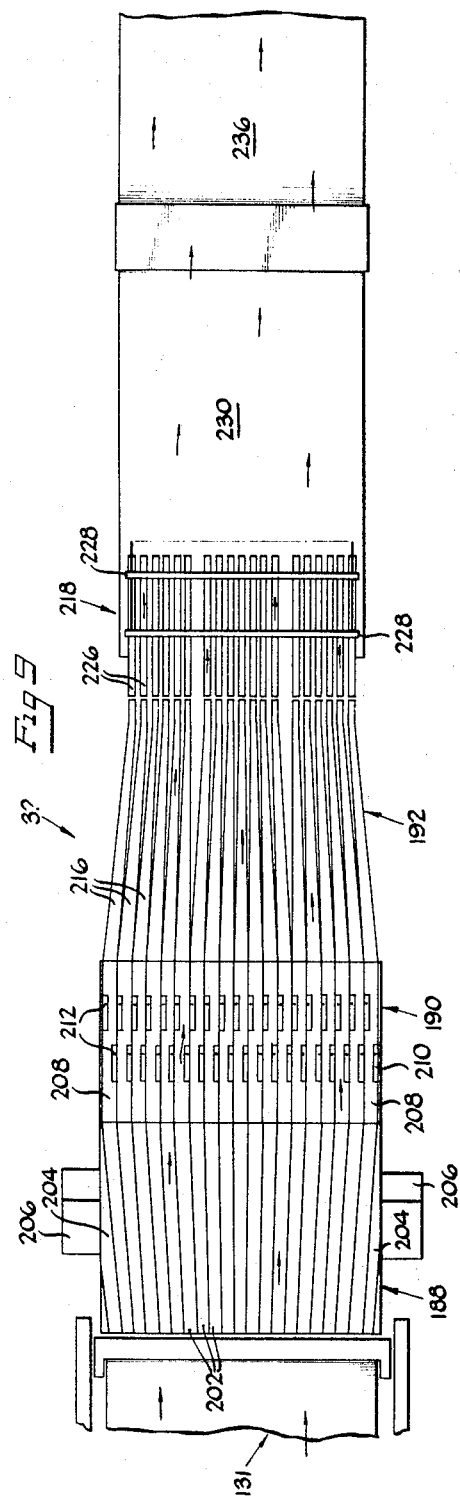
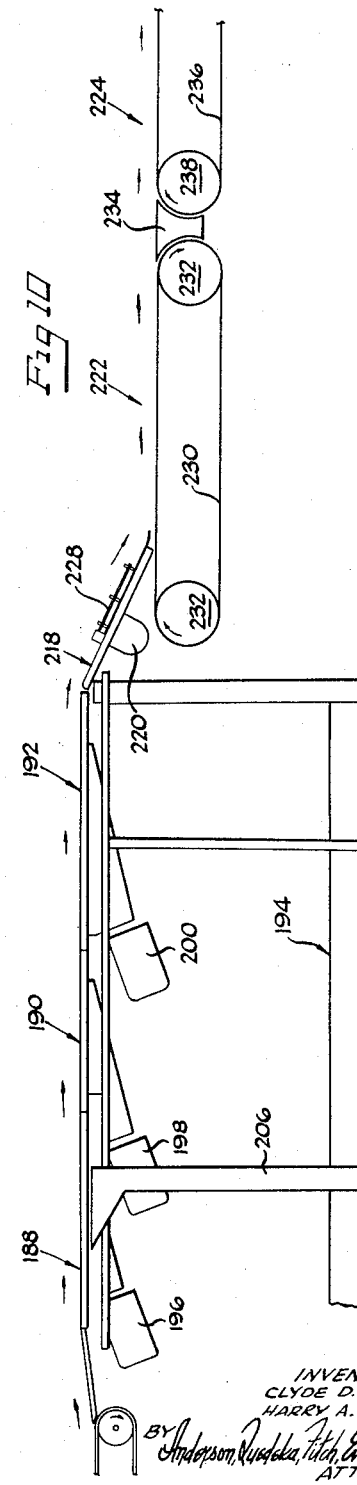

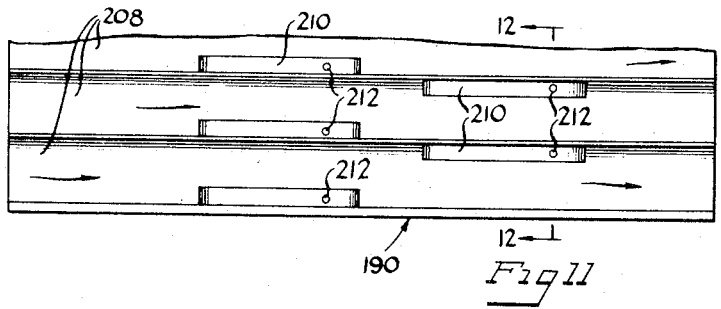
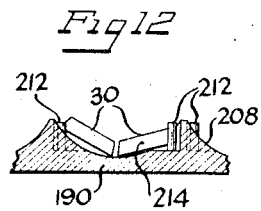
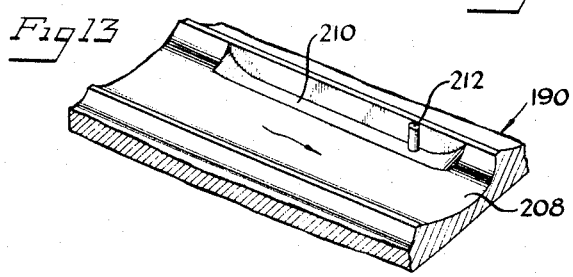
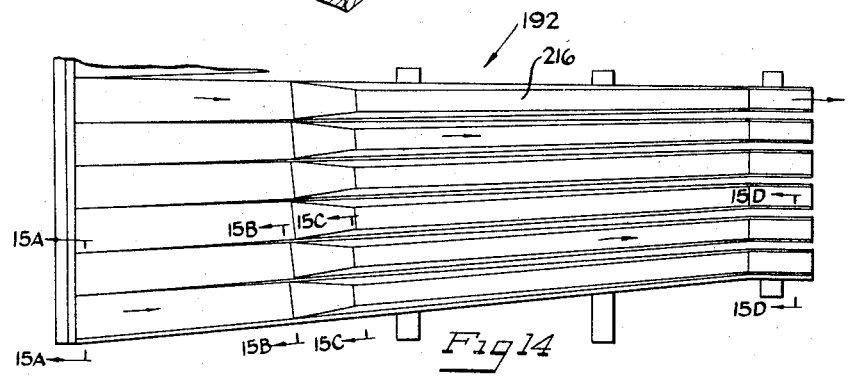
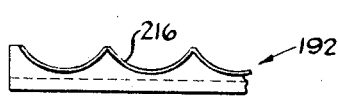
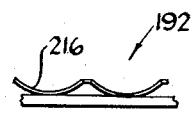
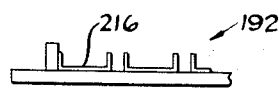
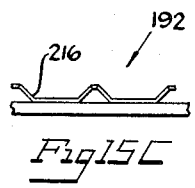

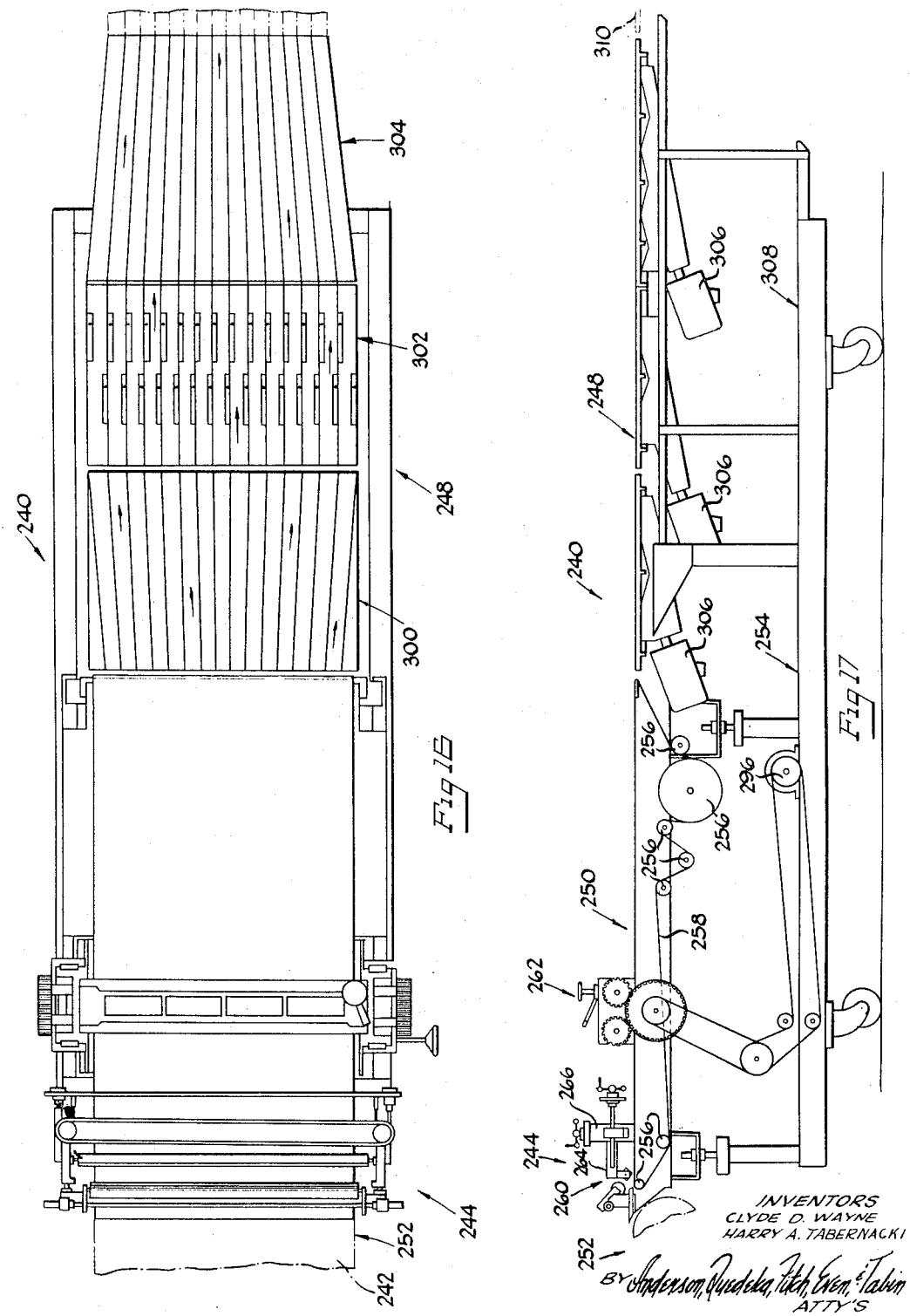

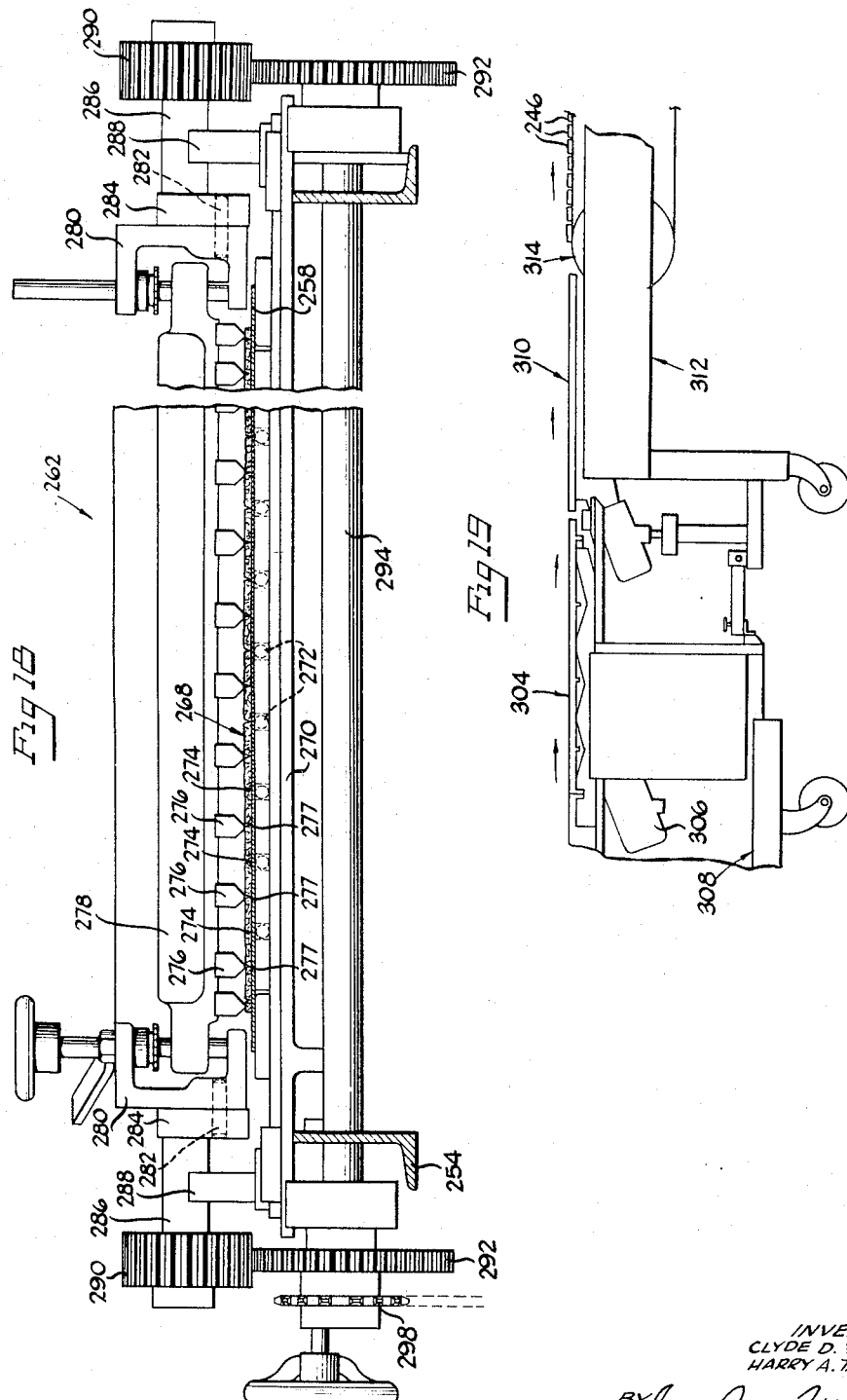

3,355,003
FOOD HANDLING APPARATUS
Clyde D. Wayne, Wilmette, and Harry A. Tabernacki, Chicago, Ill., assignors to National Dairy Products Corporation, Chicago, Ill., a corporation of Delaware
Original application June 25, 1964, Ser. No. 377,892, now Patent No. 3,301,454, dated Jan. 31, 1967. Divided and this application Apr. 26, 1966, Ser. No. 563,314
7 Claims. (Cl. 198—32)

ABSTRACT OF THE DISCLOSURE

An apparatus for receiving objects disposed in side-by-side relation and advancing them in a given direction while repositioning them into single file order. The apparatus comprises a conveyor provided with a channel having sloping side walls, at least one of which is provided with a recess within which is disposed an abutment to engage one of the pair of advancing side-by-side objects and detain it while the other object advances.

---

This is a division of Patent No. 3,301,454, issued Jan. 31, 1967.

The present invention relates generally to methods and apparatus for producing candy or other confections and has for its principal object the provision of an improved method and apparatus for automatically transforming a sheet of confectionery material into smaller pieces and for delivering such pieces past a given point in a predetermined manner.

Another object of the present invention is to provide an improved method and apparatus for scoring a sheet of confectionery material to facilitate the subsequent breaking of the sheet into smaller pieces.

A further object of the present invention is to provide an improved method and apparatus for breaking a sheet of relatively brittle material into smaller pieces along lines of weakness.

A still further object of the invention is to provide an improved method and apparatus for automatically transforming a sheet of confectionery material into pieces of predetermined size.

Another object of the present invention is to provide an improved method and apparatus for breaking a sheet of relatively brittle material into smaller pieces without disturbing the orientation of the material.

Still another object of the present invention is to provide an improved apparatus for transporting and re-aligning pieces of confectionery material incident to their travel.

Various other objects and advantages of the present invention will become more apparent from the description and the associated drawings, wherein:

FIGURE 1 is a fragmentary plan view of an apparatus showing various of the features of the present invention;

FIGURE 2 is a side elevational view of the apparatus illustrated in FIGURE 1;

FIGURE 2A is a diagrammatic perspective view of the apparatus of FIGURES 1 and 2;

FIGURE 3 is an enlarged fragmentary side elevational view showing a section of the apparatus of FIGURES 1 and 2 which is adapted to score a sheet of confectionery material;

FIGURE 4 is a fragmentary partially broken-away plan view of the portion of the apparatus shown in FIGURE 3;

FIGURE 5 is an enlarged fragmentary partially broken away front sectional view taken generally along line 5—5 of FIGURE 4;

FIGURE 6 is an enlarged fragmentary side view showing a section of the apparatus of FIGURES 1 and 2 which is adapted to break a scored sheet of confectionery material into smaller pieces;

FIGURE 7 is an enlarged fragmentary side elevational view of a portion of the apparatus of FIGURE 7;

FIGURE 8 is an enlarged partially broken-away fragmentary sectional end view taken generally along line 8—8 of FIGURE 6;

FIGURE 9 is an enlarged fragmentary plan view showing a section of the apparatus of FIGURES 1 and 2 which is adapted to transfer pieces of confectionery material in a predetermined manner past a given point;

FIGURE 10 is a fragmentary side elevational view of the portion of the apparatus of FIGURE 9;

FIGURE 11 is an enlarged plan view of a portion of the apparatus seen in FIGURES 9 and 10;

FIGURE 12 is a further enlarged sectional end view taken generally along line 12—12 of FIGURE 11 showing pieces of confectionery material;

FIGURE 13 is an enlarged fragmentary perspective view of a portion of the apparatus shown in FIGURES 11 and 12;

FIGURE 14 is an enlarged fragmentary plan view of a portion of the apparatus shown in FIGURE 9;

FIGURES 15A through 15D are enlarged fragmentary sectional end views taken generally along lines A—A through D—D, respectively, of FIGURE 14;

FIGURE 16 is a fragmentary plan view of portions of a modified form of the apparatus shown in FIGURES 1–15;

FIGURE 17 is a fragmentary side elevational view of the apparatus shown in FIGURE 16;

FIGURE 18 is an enlarged fragmentary partially broken-away sectional end view taken generally along line 19—19 of FIGURE 17; and FIGURE 19 is a fragmentary side elevational view of the apparatus shown in FIGURE 16.

The method and apparatus of the present invention are particularly adapted to be utilized in transforming a sheet of confectionery material into smaller pieces, and in delivering such pieces past a given point in a predetermined manner. In a particular application of the method and apparatus hereinafter described by way of illustration, a continuously extruded sheet of toffee or peanut brittle is transformed into smaller pieces of uniform size and shape as, for example, bar-size or bite-size pieces, which pieces are then fed directly in a predetermined orientation into an enrober which provides them with a coating of chocolate or the like.

In FIGURES 1 through 15D of the drawings, there is illustrated an apparatus 20 for treating a sheet 22 of a confectionery material which is extruded in a semi-solid state onto a conveyor 24 and gradually hardens or sets as it progresses to and through the apparatus. The apparatus 20 includes a section 26 which scores the sheet 22 while it is still in a soft or semi-solid state, a section 28 for breaking the scored sheet into small rectangular bite-size pieces 30, as dictated by the score lines, and a section 32 which delivers the pieces to an enrober (not shown).

More specifically, the flat sheet or strip 22 of confectionery material is continuously discharged from an extruder (not shown) in a hot, generally molten or semi-plastic state onto the belt conveyor 24 which carries it to and through the scorer section 26 and to the breaker section 28. The sheet cools as it is transported by the conveyor 24 and preferably achieves a relatively hard state before it arrives at the end of the conveyor and enters the breaker 28. If desired, the conveyor 24 may be enclosed in a cooling tunnel (not shown) which facilitates the cooling of the sheet and makes possible the use of a shorter conveyor.

The conveyor 24 comprises a continuous belt 34 which may be formed of any suitable liquid-impermeable flexible sheet material having a surface which will impart movement to the sheet 22 of confectionery material as the belt is moved. The belt is supported at opposite ends by rollers 36, and intermediate its ends by longitudinally extending bars or angle irons 37 positioned adjacent the edges of the belt intermediate the rolls 36 (FIG. 3).

Scoring section

The scoring section 26 of the apparatus 20, as shown best in FIGURES 2 and 3, includes a unitary movable scoring unit 38 which imparts score lines to the sheet 22 of confectionery material by the engagement of the sheet with appropriate instruments. The scoring is preferably accomplished in an area in which the sheet material is soft or plastic enough to permit the insertion of the instrument without fracture of the sheet, and yet sufficiently hard so that the sheet will retain the indentation, groove or score line created by the instrument, i.e., sufficiently hard so that the confectionery material will not recede back to its original condition after the instrument is removed. This preferred area of scoring of the sheet is supported by the conveyor 24 intermediate the ends thereof, but the exact location is dependent upon the rate of cooling and hardening of the sheet 22 which, in turn, varies with atmospheric conditions, the initial temperature and composition of the confectionery material, the speed of travel imparted by the conveyor, etc.

Accordingly, the scoring unit 38 is adapted to be moved to various locations along the conveyor 24, preferably while the sheet 22 is being moved by the conveyor, and comprises a frame 40 mounted upon wheels 42 engageable with a track 44 which extends the length of the conveyor. Thus, the scoring unit 38 is selectively movable longitudinally of the conveyor 24 and, hence, of the elongated sheet 22 of confectionery material, to a position along the path of the sheet where the sheet has the appropriate hardness for effective scoring. In order that the scoring unit 38 might be secured in a desired location relative to the conveyor 24, locking devices 45 (FIG. 3) are provided on the frame 40 for releasable engagement with suitable fixed portions of the conveyor 24 as, for example, the longitudinally extending angle irons 37, previously mentioned. The frame 40 is of generally open construction so as to permit it to straddle the conveyor 24 without interfering with the operation thereof.

The frame includes a generally rectangular base 46 which supports certain of the power components of the unit 38, and four vertical corner posts 48 which are interconnected by longitudinally and transversely extending cross members 54 and 56 positioned above the belt 34 in overhanging relation thereto to form a platform for the scoring mechanism hereinafter described.

The scoring mechanism provides the sheet 22 with transversely extending score lines 58 and with longitudinally extending score lines 60 (FIG. 2) which, together, provide the sheet with a criss-cross pattern which divides the sheet into segments approximately ⅞ inch wide and 1½ inches in length. The scoring can be accomplished in any desired sequence, i.e., the transverse score lines may be provided first followed by the longitudinal score lines, or vice versa. However, in the illustrated embodiment, which represents a preferred arrangement, the sheet 22 is first provided with transverse score lines 58, then with longitudinal score lines 60, and then re-scored longitudinally to emphasize the previously provided lines 60.

The transverse score lines 58 are provided by the transverse scoring mechanism 62 which is mounted on the frame 40 and includes an eccentrically movable carriage 64 comprising a pair of longitudinally arranged end plates 66 (FIG. 4), one of which is positioned adjacent each side of the frame 40, and a pair of transversely extending longitudinally spaced parallel tubular cross bars 68 which are secured in holes in the end plates and serve to interconnect the end plates 66. Angle iron cross beams 69 positioned above the bar 68 also serve to interconnect the end plates 86. A shaft 70 having an eccentric end portion 72 extends through each of the tubular cross bars 68, with the eccentric end portions 72 journalled in suitable bearings mounted on the cross members 54 of the frame 40. Drive sprockets 74 (FIG. 3) are secured to adjacent ends of each of the shafts and are connected by a drive chain 76 to a motor 78 mounted on the base 46. A spring biased pulley 80 is provided to take up slack in the chain 76.

When the sprockets 74 are rotated by the motor 78, they impart rotation to the eccentric end portions 72 of the shafts 70, thus causing an eccentric movement of the center portion of the shaft disposed within the tubular cross bars 68 of the carriage. This eccentric movement is translated to the cross bars 68, thereby imparting a generally elliptical motion to the carriage 64 and to the transverse scoring mechanism 62. More specifically, rotation of the sprockets 74 causes the carriage to move downwardly into proximity to the sheet 22; move forwardly with the sheet at a speed equal to the speed of the sheet (during which movement of one or more transversely extending score lines 58 are made); move upwardly to a position above the sheet; and finally move rearwardly to its initial position from which it again moves downwardly into proximity to the sheet to again provide transverse score lines. Thus, the transverse score lines 58 are imparted to the sheet 22 while it is in motion through the apparatus, but without relative horizontal movement, at the time of scoring, between the scoring instrument and the sheet.

The transverse score lines 58 are imparted to the sheet 22 by means of a transversely disposed set of parallel blades 82 having a sharpened or knife-like lower edge and provided with a pair of upstanding ears 84 adjacent their upper edge (FIG. 5). The blades 82 are supported on the carriage 64 by means of a pivotal connection between each of the ears 84 and the apex of one of a pair of triangularly shaped segments 86, each of which is, in turn, pivotally connected at another of its apices to the carriage 64, as on the cross beams 69 extending transversely of the carriage above the cross bars 68. The third apex of each of the triangular segments 86 is pivotally connected to opposite ends of an elongated link 88, which link is in turn connected at one end to an air cylinder 90 mounted on the carriage 64. Actuation of the air cylinder extends and retracts the link 88, thereby pivoting the triangular segments on the carriage 64 so as to lower and raise the blades 82. Preferably, the lowering of the blades is timed to occur when the carriage is in the lowermost point of its elliptical travel and in closest proximity to the belt 34. A block 92 mounted on the carriage 64 provides a lip 94 which is positioned to engage a portion of one of the ears 84 of the blades 82 when the blades are moved downwardly so as to limit downward movement of the blades to a position in which their lower edges are spaced slightly above the belt 34 but do not contact the belt. Thus, the sheet 22 is weakened but not severed along the lines 58 by the blades 82.

The longitudinally extending score lines 60 are provided in the sheet 22 by a pair of longitudinal scoring mechanisms 96 (FIG. 4) mounted on the frame 40 and spaced from each other a short distance as, for example, twelve inches. Each longitudinal scoring mechanism 96 includes a plurality of disks 98 supported in spaced-apart relation to one another on a shaft 100 having a sprocket 102 mounted on one of its ends and connected by means of a chain 104 to a motor 106 supported on the frame base 46. The shaft 100 is supported by the frame 40 above the sheet 22 and in transversely disposed relation thereto, with each of its ends rotatably mounted adjacent one end of an elongated generally horizontally disposed side plate 108, which side plates are in turn pivotally mounted adjacent the other of their ends to one of the longitudinally extending cross members 54 of the frame 40. Accordingly, pivotal movement of the plates 108 on the frame 40 is effective to raise or lower the shaft 100 and the disks 98 as desired. Pivotal movement of the side plates 108 is accomplished by rotation of a shaft 110 which extends between the side plates 108 and is provided with an eccentric cam 112 at each end which engages the upper surface of the cross member 54 to elevate the shaft 110 and with it the associated portion of the side plates 108. Rotation of the shaft 110 is accomplished by means of a crank 114. A pulley 116 is preferably provided to take up the slack provided in the chain 104 to permit raising and lowering of the shaft 100.

As represented in FIGURE 4, the disks 98 are disposed in generally parallel equally spaced vertical planes extending longitudinally of the sheet, with their lower edges sharpened and positioned in close proximity to, but not in engagement with, the conveyor belt 34. As the sheet 22 moves beneath the rotating disks, the longitudinally extending score lines 60 are thereby formed in the sheet. The disks of each of the shafts 100 lie in the same planes so that the disks of the forwardmost shaft 100 will rescore the lines 60 initially provided by the disks of the rearwardmost shaft.

In a preferred embodiment of the scoring section 26, thirty-nine scoring disks 98 are spaced across a sheet 22 34″ in width to provide longitudinally extending score lines 60 for dividing the sheet into thirty-eight sections, each having a width of approximately ⅞″.

*Breaking section*

The breaking section 28 shown generally in FIGURES 1 and 2 and more particularly in FIGURES 6-8, comprises a transverse breaking means 118 (FIG. 7) which breaks the sheet 22 along the transverse score lines 58, and a longitudinally breaking means 120 (FIG. 8) which breaks the sheet along the longitudinal score lines 60. As shown best in FIGURE 2, the transverse and longitudinal breaking means 118 and 120 are mounted on a generally rectangular open mobile frame 122 which includes a base 124 supported on wheels 126, and vertical posts 128 having a top structure including side plates 130 secured to their upper ends. The top structure is inclined upwardly from rear to front as shown best in FIGURES 2 and 6, and supports an upwardly and forwardly inclined conveyor 131 comprising an endless belt 132 supported by rolls 134 which are driven by suitable connection to a power means (not shown). The frame 122 is positioned at the forward end of the conveyor 24 of scoring section 26 so that the sheet 22 will pass from the belt 34 of the conveyor 24 onto the belt 132 of the conveyor 131.

The transverse breaking of the sheet 22 is accomplished by effecting a bending of the sheet along a transverse score line 58 incident to engagement of the forward edge of the moving sheet with a stationary deflecting surface 136 (FIG. 7), thereby effecting a separation from the sheet of a transversely extending segment 138 having a length equal to the distance between a pair of the transverse score lines 58 and a width equal to the width of the sheet 22. The sheet is progressively broken along successive lines 58 to thereby progressively separate the aforementioned segments 138.

More specifically, and as seen best in FIGURE 7, the illustrated transverse breaking means 118 includes a generally level breaker support plate 140 which is positioned intermediate, and in alignment with, the conveyors 24 and 131 so as to receive the sheet 22 from the conveyor 24 and support it as it passes onto the conveyor belt 132. The plate 140 is adjustably supported on a pair of brackets 142 secured to the upper rearward end of the breaker frame 122, and is connected to the brackets 142 by bolts 144 so as to permit adjustment of the longitudinal position of the plate in the gap intermediate the conveyors.

The rearward end of the plate 140, i.e., the end immediately adjacent the conveyor 34, is bevelled to generally conform to the curvature of the conveyor 24, thereby enabling the plate to be positioned in close proximity to the conveyor 34. The forward end of the plate 140 is formed to provide a forwardly downwardly inclined surface 146, the lower edge of which is positioned immediately above the upper surface of the rearward end of the inclined conveyor belt 132 and which serves, as will be more readily understood in the light of the following description, to prevent stacking or backing-up of the segments 138 which are broken from the sheet and allowed to drop toward the conveyor 132. The upper edge of the surface 146 defines the edge along which the breaking of the sheet occurs when the forward edge of the sheet is bent downwardly relative to the plane of the upper surface of the plate 140, as will be seen shortly.

In order to insure that the sheet will lie flat upon the upper surface of the plate 140 and thus preventing the sheet from bowing or curving upwardly when the forwardmost edge thereof is deflected downwardly, a hold down mechanism 148 is provided. The hold down mechanism 148, by causing the sheet 22 to lie flat on the plate 140, insures that the break will occur along the forwardmost transverse score line 60 rather than along a score line more rearwardly located, and insures that the transverse lines 60 will pass over the upper edge of the surface 146 in timed sequence.

The illustrated hold down mechanism 148 comprises an idler roller 150 which, as shown best in FIGURE 7, is positioned with its lowest point immediately above the path of the sheet at the forwardmost end of the support plate 140 and extends transversely the full width of the sheet. The roller 150 is mounted for free rotation on a transversely extending horizontally disposed shaft 152 that is supported by plates 154 which are pivotally mounted on brackets 156, one of which extends upwardly from, and is adjustably secured adjacent, each end of the plate 140. Accordingly, the roller 150 is free to revolve when engaged by the scored sheet 22 passing beneath it. Also, since the roller-supporting plates 154 are pivotally mounted on the frame 40, the weight of the roller will maintain it in contact with the sheet 22 by gravity bias.

The illustrated roller 150 comprises a rigid core 157 enclosed in an inner sleeve 159 of a relatively soft, porous resilient, flexible material such as foam rubber which, in turn, is enclosed in an outer layer 161 of a flexible relatively non-porous material. The intermediate layer or sleeve 159 affords resiliency to the roller 150 and accommodates minor variations in sheet thickness. The outer non-porous layer 161 prevents the generally porous intermediate layer 159 from becoming impregnated with substances removed from the sheet 22 of confectionery material. Thus, the roller 150 fixedly positions, yet resiliently holds, the sheet 22 during the operation of the transverse breaking means 118.

The surface 136 which deflects the forward edge of the sheet 22 downwardly so as to effect a bending and ultimate breaking thereof may have a number of suitable configurations but that which is preferred, and which is shown in the illustrated embodiment, is defined by a face of a breaking bar 158 of square cross section which is disposed in transversely extending position above the conveyor belt 132 somewhat forwardly of the forward edge of the plate 140. The breaker bar is oriented with its face defining the surface 136 inclined downwardly and forwardly so as to deflect downwardly the forward edge of a sheet which engages it. The illustrated bar 158 is supported at opposite ends by plates 160 depending from a mounting 162 adjustably supported on a frame 164 for longitudinal movement by means of a crank 166 and for vertical movement by means of a crank 168.

When the forwardmost end of the sheet 22 engages the camming or deflecting surface 136, the forwardmost segment 138 of the sheet is forced downwardly along the forwardmost transverse scoring line 60 relative to the remainder of the sheet, which is held flat by the hold down roller 150. This movement results in a breaking of the sheet along the line 60 and a separation of the forwardmost segment 138 from the remainder of the sheet. As the separated segment falls, its rearward edge engages the inclined forward surface 146 of the plate 140, giving the segment a forward impetus as it drops onto the upwardly inclined conveyor 132 which has its rearward end disposed immediately below the forward end of the plate 140. This impetus prevents the segments from slipping rearwardly down the conveyor 131, and from stacking immediately below the breaking edge of the plate 140. The segments 138 are carried by the belt 132 to the longitudinal breaking means 120 hereinafter described.

The breaking section 28 also includes the longitudinal breaking means 120, shown best in FIGURE 8, which is positioned intermediate the ends of the conveyor 131 in forwardly spaced relation to the transverse breaking means 118. The segments 138 which are separated from the sheet 22 and are delivered to the longitudinal breaking means 120 in transversely extending orientation by the conveyor 131 are broken substantially simultaneously by the means 120 along each of the score lines 60 extending thereacross so as to separate the segment 138 into a plurality of the bite-size pieces 30. Very generally, this breaking is accomplished by applying downward forces to the segment in the vicinity of every other score line 60 and applying an upward, reaction force to the segment in the vicinity of every score line 60 to which a downward force was not applied. Hence, the successive score lines have either an upward or a downward force applied thereto, with the forces applied to adjacent lines being opposite in direction to one another.

In the illustrated embodiment, the upwardly directed forces are applied to the segment 138 by means of a plurality of elongated rigid support rods 170 (FIG. 8) arranged immediately beneath the upper run of the belt 132 in parallel relation to the direction of movement of the belt. Each of the support rods 120 is aligned under an alternate longitudinal score line 60 of a segment 138, i.e., a rod is positioned under every other longitudinal score line of the segment, these score lines being designated by the numeral 172 in FIGURE 8. The remaining score lines, designated by the numeral 174 in FIGURE 8, are unsupported. The spaces between the rods 170 are void so that the belt 132 is essentially unsupported in these areas and can flex readily.

Disposed above the belt 132, the sheet 22 and the support rods 170, is a sub-frame assembly 178 which includes vertical uprights 180 positioned adjacent each of the conveyor side plates 130 and connected at their upper ends by a cross member 182. Rotatably journalled at its opposite ends in the uprights 182 is a shaft 184 which extends transversely of the sheet 22 above the support rods 176 and carries a plurality of circular breaking elements 186, which are thus disposed in planes extending longitudinally of the belt 132. The elevation of the shaft 184 above the sheet 22 is such that the lowermost edges of the circular breaking elements 186 will compressively engage the segments 138 of the sheet, the elements being so positioned along the shaft as to engage the segment 138 at a longitudinal score line 174 intermediate the longitudinal score lines 172 which are supported by the rods 170.

As a segment 138 passes, or is moved forwardly, beneath the breaker elements 186 and over the support rods 170, it is broken along each of its longitudinal score lines. More particularly, each of the circular breaking elements 186 forces a portion of the segment 138 disposed directly beneath it downwardly while the rods 170 support the level of the portions of the segment intermediate the points of engagement by the breaker elements. Accordingly, the segment is bent downwardly and upwardly at alternate score lines. The combined effect of the elements 186 and rods 170 is to break the segment 138 along each of the lines 172 and 174 so as to divide the segment into a plurality of separate pieces 30. However, after the aforementioned breaking of the segment, the pieces 30 remain in their initial orientation relative to one another as they continue their forward movement through the apparatus. This maintenance of orientation of the material after it is broken into the smaller pieces is a distinct advantage in the feeding of the pieces to the subsequent processing equipment, such as the equipment for enrobing the pieces in chocolate, as hereinafter described.

Occasionally, the segments 138 weave slightly when moving toward the longitudinal breaker 120, thus causing the longitudinal score lines 60 to move out of alignment with the breaker elements 170 and 186. To compensate for this movement, the longitudinal breaker 120 may be mounted for movement transversely of the conveyor, as by an adjusting screw 187 (FIG. 8).

*Feeding section*

In the illustrated embodiment of the apparatus, a segment 138 of the sheet 22 is broken into thirty-eight pieces of uniform size. It is desirable, however, that a lesser number of rows of pieces be delivered to the enrober so that an enrober of lesser width may be utilized. Accordingly, in the section 32 of the illustrated embodiment, the segment 138 is converted into nineteen rows of pieces which are then conveyed in a predetermined manner to the enrober.

More specifically, the section 32 of the illustrated apparatus 20 (FIGS. 9 and 10) which delivers the pieces 30 to subsequent processing equipment such as an enrober (not shown) includes three longitudinally aligned, generally level, directional vibrator pans 188, 190 and 192 mounted on a frame 194. Each of the pans is provided with suitable vibrator means 196, 198 and 200, respectively, also mounted on the frame, which induce vibrations in the pans 188, 190 and 192 such as will cause the pieces 30 to move in a forwardly direction along the pans.

The rearwardmost pan 188 receives pieces from the breaker conveyor 131 and is provided with nineteen longitudinally extending forwardly diverging channels 202 which are capable of conveying the pieces 30 to the intermediate pan 190. In addition, an edge channel 204 is provided at each side of the pan 188 and is disposed so as to direct trim or edge material of the sheet 22 laterally off the side edge of the pan into a suitable receptacle such as a pipe 206. Such material is generally not suitable for enrobing because of variations in its width and is subsequently reprocessed.

Each of the nineteen channels 202 and 204 of the first vibrator pan 188 are concave in cross section, with the channels 202 being wide enough to receive two of the pieces 30 entering the channel abreast of one another, the thirty-eight pieces thus being accommodated in the nineteen channels, preferably, the longitudinal movement of the pieces in the pan 188 as induced by the means 196 is substantially greater than the movement induced by the conveyor 131. Hence, the longitudinal spacing between the pieces is increased as they move from the conveyor 131 to the pan 188. The pan 188 therefore separates the pieces 30 into nineteen pairs and separates the pairs longitudinally from one another.

The second vibrational pan 190 continues to impart forward movement to the pieces 30 and, in addition, reorients each pair of pieces from a side-by-side arrangement to a single file row. In this regard, the pan 190 is provided with channels 208 having a configuration generally similar to that of the channels 202 of the pan 188, with each of the channels 208 being aligned with one of the channels 202.

The reorientation of the pieces 30 is accomplished by the provision of a pair or recesses 210 in each channel arranged adjacent opposite edges thereof and spaced longitudinally from each other (FIGS. 11–13). A generally vertically disposed pin 212 projects upwardly from the base of each recess to a height approximating that of the sides of the channels. As a pair of side-by-side pieces 30 advance in a channel 208, one of the pieces drops into a recess 210 and thereafter arrestingly engages a pin 212. The adjacent piece of the pair is free to advance, however, and does so. After it has passed the arrested piece, the latter is free to move laterally toward the center of the channel and by-pass the pin. This lateral movement is facilitated by location of the inner edge of the recess 210 which engages the piece 30 at a point spaced outwardly from the center of gravity of the piece, indicated by the numeral 214 in FIGURE 12, giving the piece a tendency to move inwardly of the channel.

In the operation of the reorientation means, the recesses are effective to prevent the pieces from riding up one side of the channel and by-passing a pin 212 located on the opposite side of the channel from that one side. The pair of recesses are provided to insure that if a pair of pieces somehow by-passes one of the pins in side-by-side relation, they will be arrested by the second pin.

The third directional vibrator pan 192 includes longitudinally extending channels 216, each of which is aligned with one of the channels 208 of the second vibrator pan 190 and receives one of the single file rows of confectionery pieces from the pan 190. The channels 216 converge toward one another from the rearward to the forward end of the pan 192, and the configuration and width of each channel varies throughout its length. More specifically, as seen best in FIGURES 15A through 15D, the channels 216 are generally upwardly open and of concave cross section adjacent the rearward edge of the pan. Forwardly of this point, the channels become narrower and more shallow while the separation between channels becomes greater (FIG. 15B). Still forwardly, the channels become generally flat-bottomed with outwardly-flared side walls (FIG. 15C). Adjacent the forward edge of the pan 192, the channels are considerably narrower with flat bottoms and generally vertical side walls (FIG. 15D).

In line with the forward end of the pan 192 is a downwardly inclined chute 218 vibrated by a suitable vibrator means 220 and leading to a discharge conveyor 222 and thence to an enrober conveyor 224. The pieces 30 are allowed to back up slightly in the chute 218 to insure a steady flow to the conveyor 222 which removes the pieces from the chute and conveys them to the conveyor 224. In the transfer of the pieces from the conveyor, they are separated longitudinally a given distance from one another.

More specifically, the illustrated chute 218 is provided with nineteen longitudinally extending, parallel, downwardly and forwardly inclined channels 226, each of which is in alignment with one of the channels 216 of the pan 192. Guide bars 228 are positioned above the chute to prevent toppling or buckling of the pieces 30 which stack end to end in the chute.

The pieces 30 are removed from the lower end of the chute 218 in end-to-end arrangement by the conveyor 222 and are thereby spaced uniformly when delivered to the conveyor 224. The conveyor 222 comprises a continuous belt 230 supported at opposite ends by rollers 232, and is positioned relative to the chute 218 such that pieces 30 engage the belt 230 in forwardly spaced relation to its rearward end and are drawn out of the chute by the forward movement of the upper run of the belt.

The conveyor 222 discharges the pieces 30 in end-to-end arrangement onto an intermediate plate 234 supported between the conveyors 222 and 224. The conveyor 224 is positioned with its rearward end adjacent the forward end of the plate 234 and comprises a continuous belt 236 supported on rollers 238. The belt 236 is driven at a speed somewhat greater than that of the belt 230 so as to separate the pieces 30 longitudinally incident to their entry into the enrober (not shown).

The method of the invention, as practiced by the apparatus 20, is seen most clearly in the diagrammatic view of FIGURE 2A. As will be noted, the sheet 22, moved in a predetermined forward direction by the conveyor 24, is provided with transverse score lines 58, as by the transverse scoring mechanism 62, and subsequently with longitudinal score lines 60, as by the longitudinal scoring mechanism 96. The scored sheet then is broken along the forwardmost transverse score line, as by engagement with the breaker bar 158 of the breaking means 118, to provide the transversely extending segments 138 which are subsequently broken along the longitudinal score lines 60 thereof, as by the action of the longitudinal breaking means 120, so as to separate the segments into the pieces 30.

After the pieces 30 of a segment 138 are detached from one another along the longitudinal score lines, they are separated into pairs of side-by-side pieces upon entry into the vibrator pan 188, the spacing between any given pair and a succeeding pair being increased upon entry into the pan 188 by virtue of a difference in speed between the speed of movement imparted by the pan 188 and the conveyor 131 of the breaking section 28. The pieces 30 of each pair are then separated from each other, as by the pins 121 of the pan 190, and travel in single file over the pan 192.

The single file columns of pieces are then condensed by substantially eliminating the spaces between the pieces, as in the chute 218 which moves the pieces at a rate of speed less than that of the pans 188, 190 and 192 and discharges them in condensed arrangement onto the moving conveyor 222. Finally, a uniform spacing is provided between the pieces, as by a transfer of the pieces from the conveyor 222 onto the conveyor 224 which moves the pieces at a somewhat faster rate of speed.

*Apparatus for bar-size centers*

The above-described apparatus 20 is particularly adapted for the scoring and breaking of a sheet 22 into bite-sized pieces, and for the delivery of the pieces to enrobing equipment in a predetermined arrangement. It is frequently desirable, however, to provide pieces of somewhat greater size, i.e., bar-size pieces. For such pieces, a somewhat modified form of apparatus 240 is provided, such as that shown in FIGURES 16 through 19. The apparatus 240 is adapted to receive a suitably scored sheet 242 from a scorer assembly (not shown) as, for example, a sheet in which the transverse and longitudinal score lines are spaced a greater distance from one another. Such a scoring pattern might be achieved by utilizing only one rather than two scoring knives in an assembly such as the transverse scoring mechanism 62 previously described, and in spacing the cutting disks 98 of each longitudinal scoring mechanism 96 slightly farther from one another.

Very generally, the apparatus 240 includes a breaking section 244 which transforms the scored sheet 242 into bar-size pieces 246, and a section 248 which transports and orients the pieces 246 for delivery to an enrober (not shown).

More specifically, and as seen best in FIGURES 16 and 17, the breaking section 244 includes a conveyor 250 which is positioned forwardly of, and in alignment with, the forward end of a conveyor 252 which transports the appropriately scored sheet 242 of confectionery material from a suitable scoring means (not shown). The conveyor 250 comprises a wheeled frame 254 provided with suitable rollers 256 which support a driven belt 258.

As shown best in FIGURES 16 and 17, the frame 254 supports at its rearmost end a transverse breaking means 260 and, spaced a short distance forwardly thereof, a longitudinal breaking means 262. The transverse breaking means 260 is situated directly above the belt 258 of the conveyor 250 and is generally similar to the transverse breaking means 118 of the apparatus 20 in that it includes a breaker bar 264 adjustably supported by a sub-frame 266. The transverse breaker 260 separates the sheet 242 into a plurality of transversely extending segments 268.

As shown best in FIGURE 18, the longitudinal breaking means 262 is supported on the frame 254 above the upper run of the belt 258 of the conveyor 250 and includes a transversely-extending generally level platform structure 270 disposed below the upper run of the belt 258. The platform structure 270 supports a plurality of transversely spaced rigid support rods or elements 272 similar in arrangement and in configuration to the rods 170 of the apparatus 20. Each of the rods 272 is generally aligned with an alternate longitudinally-extending score line 274 of the segments 268.

In the apparatus 20, the rods 170 cooperate with circular breaker elements 186 which apply downwardly directed forces to the segments 138. However, the use of such elements in the longitudinal breaking of the longer bar-size segments is not entirely satisfactory since the circular elements apply a force initially at the forward end of the segment, thus causing the break to commence at this point. With a segment of substantial length, the break may not progress rearwardly along the longitudinal score line but instead follow a jagged and random path. To insure uniform breaking, the upper surface of the bar-size segment 268 is engaged instead at alternate score lines 277 by elongated longitudinally disposed flat elements 276 which span the segment and effect a break along the entire score line substantially simultaneously. Preferably, the elongated breaking elements 276, and also the elongated support rods 272, each have a length at least as great as the length of the longitudinal score lines 274 of the segments 268.

More specifically, and with reference to FIGURE 18, the elongated flat breaker elements 276 are preferably formed so as to provide a relatively narrow lower edge engageable with the segment 268, and are secured to the lower portion of a transversely extending horizontally disposed cross bar 278 which is adjustably supported at opposed ends in a C-shaped bracket 280. Each bracket 280 is, in turn, pivotally mounted, as by a pin 282, to one end of an elongated plate 284, the other end of which is fixedly secured to a shaft section 286 rotatably journalled in a bearing block 288. Each shaft section 286 has a gear 290 keyed to its outer end which is in meshing engagement with a larger gear 292 keyed adjacent each end of a drive shaft 294 extending transversely beneath the conveyor 250 and driven by a chain connection between a motor 296 and a sprocket 298 keyed to the shaft 294.

In the operation of the breaker 260, rotation of the shaft 294 causes rotation of the shaft sections 286 and, by crank action, reciprocal movement in a generally circular path of the bar 278 supporting the breaker elements 276. This circular movement causes the elements to move into contact with the sheet segment 268 and then advance with the segment while exerting a downward force in the vicinity of the score lines 277. This downward force is resisted by the rods 272, each of which lie beneath the segment in the vicinity of the score lines 274. The combined effect of the rods 272 and elements 276 is to fracture the segment 268 along each of the score lines 274 and 277 substantially simultaneously.

In the apparatus 240, the bar-size pieces 246 are delivered by the conveyor 250 underlying the transverse longitudinal breakers 260 and 262 respectively to a set of three directional vibrator pans 300, 302 and 304 respectively which are similar in construction to the pans 188, 190 and 192 of the apparatus 20 except that each pan includes a fewer number of channels than the pans of the apparatus 20. Each of the pans 300, 302 and 304 has attached thereto a vibrator 306 and is mounted on a mobile frame 308 which may be integral with the frame 254 of the breaker section, or may be attached thereto.

In the apparatus 20, the centers discharged from the pan 192 onto a chute 218 where they were caused to stack and thus be discharged at a uniform rate onto the conveyor 224 leading to an enrober. In the apparatus 240, however, the bunching of the pieces 246 is accomplished by a supplementary level vibrator pan 310 (FIG. 19) which is supported on a mobile frame 312. The pan 310 receives pieces 246 from the pan 306 and delivers them to a belt conveyor 314. However, the pan 310 vibrates at a slower rate than the pan 306, thus allowing the pieces to "back up" on the pan 310 and to discharge at a steady rate onto the conveyor 314. The conveyor 314 discharges onto a subsequent conveyor (not shown) which is operated at a faster rate than the conveyor 314 to provide a spacing of uniform distance between the pieces.

*Summary*

Thus, each of the illustrated apparatus provides effective automatic and continuous cross-scoring of a continuously moving sheet of confectionery material, the breaking of the sheet along the score lines into pieces of uniform size, and the delivery of the pieces past a given point in a predetermined manner.

Various modifications and changes may be made in the illustrated structure and the particulars of the method described without departing from the scope of the present invention.

Various of the features of the present invention are set forth in the following claims.

What is claimed is:

1. An apparatus for receiving objects disposed in side-by-side relation and advancing them in a given direction while repositioning them into single file order, said apparatus comprising a conveyor defining a channel extending in said given direction and having side walls arranged so as to enable a pair of objects disposed in side-by-side relation to be advanced therealong, said conveyor being operable to move the objects along the channel in the given direction, said side walls of said channel being formed so as to slope upwardly in both directions from adjacent the longitudinal centerline of said channel, means defining a recess in at least one of the sloping side walls of said channel effective to receive a side edge portion of one of a pair of side-by-side objects, and means defining an abutment within said recess effective to engage the leading edge of the one of the pair of side-by-side objects and detain said object until the other of the pair of objects has passed so as to thereby re-orient the objects from a side-by-side to a single file disposition.

2. An apparatus in accordance with claim 1, wherein said recess has a length at least as great as the length of the side edge of any of the objects as measured in the direction of movement thereof.

3. An apparatus in accordance with claim 1, wherein said recess is shaped so as to facilitate entry of the object into said recess.

4. An apparatus in accordance with claim 1, wherein a recess and abutment are provided in each of opposite side walls of said channel, said recesses being spaced longitudinally from each other.

5. An apparatus in accordance with claim 1, wherein said recess has a generally flat bottom wall and a generally vertical side wall, and wherein said abutment is in the form of an upstanding pin positioned adjacent said vertical side wall.

6. An apparatus in accordance with claim 5, wherein the distance between said vertical side wall and the edge of the base of said recess nearest the center of said channel is less than one-half the width of an object within said channel.

7. An apparatus in accordance with claim 1, wherein the side walls of said channel curve upwardly from the center thereof.

References Cited

UNITED STATES PATENTS

| | | | |
|---|---|---|---|
| 2,549,322 | 4/1951 | McKinsey | 198—32 X |
| 2,586,523 | 2/1952 | Dudley | 198—30 |
| 3,155,221 | 11/1964 | Griner | 198—34 |
| 3,224,551 | 12/1965 | Talbot et al. | 198—32 |

FOREIGN PATENTS

| | | |
|---|---|---|
| 415,844 | 7/1925 | Germany. |

OTHER REFERENCES

German printed application 1,004,103, April 1957.

EVON C. BLUNK, *Primary Examiner.*

R. J. HICKEY, *Assistant Examiner.*